United States Patent
Go et al.

(10) Patent No.: US 9,459,863 B2
(45) Date of Patent: Oct. 4, 2016

(54) SYSTEM FOR ASSESSING AN APPLICATION FOR TABLET COMPATIBILITY AND QUALITY

(71) Applicant: Google Inc., Mountain View, CA (US)

(72) Inventors: Alec Go, Mountain View, CA (US); Sheng Chi Hsieh, Mountain View, CA (US); Atul Kumar, Palo Alto, CA (US); Kenneth Lui, Palo Alto, CA (US); Nicolaus Todd Mote, Mountain View, CA (US)

(73) Assignee: Google Inc., Mountain View, CA (US)

( * ) Notice: Subject to any disclaimer, the term of this patent is extended or adjusted under 35 U.S.C. 154(b) by 288 days.

(21) Appl. No.: 14/052,125

(22) Filed: Oct. 11, 2013

(65) Prior Publication Data

US 2015/0106384 A1    Apr. 16, 2015

(51) Int. Cl.
G06F 17/30    (2006.01)
G06F 9/44     (2006.01)
G06F 11/34    (2006.01)

(52) U.S. Cl.
CPC . *G06F 8/77* (2013.01); *G06F 8/38* (2013.01); *G06F 8/76* (2013.01); *G06F 11/3466* (2013.01); *G06F 17/3053* (2013.01)

(58) Field of Classification Search
CPC .. G06F 11/0742; G06F 17/3053; G06F 8/76; G06F 11/3466
USPC .......... 707/723, 736, 756, 755; 715/744–747
See application file for complete search history.

(56) References Cited

U.S. PATENT DOCUMENTS

| | | | |
|---|---|---|---|
| 8,229,080 B2 * | 7/2012 | Sharma ................. | H04M 3/242 370/352 |
| 8,230,265 B2 | 7/2012 | Rajashekara et al. | |
| 8,788,944 B1 * | 7/2014 | Gill ........................... | G06F 8/61 715/744 |
| 2009/0124251 A1 | 5/2009 | Niccolini | |
| 2012/0096435 A1 | 4/2012 | Manolescu et al. | |
| 2013/0227078 A1 * | 8/2013 | Wei ........................ | H04L 67/02 709/219 |
| 2013/0227079 A1 * | 8/2013 | Wood ................ | H04L 29/06027 709/219 |
| 2013/0304934 A1 * | 11/2013 | Joch ....................... | H04L 65/607 709/231 |

OTHER PUBLICATIONS

Fu et al.,"Why People Hate Your App—Making Sense of User Feedback in a Mobile App Store", Knowledge Discovery and Data Mining 2013, Chicago, Illinois, USA, Aug. 11-14, 2013, 9 pages.
Heitkotter et al.,"Evaluating Frameworks for Creating Mobile Web Apps", WEBIST—9th International Conference on Web Information Systems and Technologies, 2013, pp. 209-221.

* cited by examiner

*Primary Examiner* — Marc Filipczyk
(74) *Attorney, Agent, or Firm* — Morris and Kamlay LLP

(57) ABSTRACT

Applications that have been designed for a smaller format device such as a smartphone and simply ported to a larger format device such as a tablet can be discerned from applications designed specifically for the larger format device. An application can be evaluated based on tablet compatibility criteria and can be assigned a tablet compatibility score. The application can be evaluated based on quality criteria and can be assigned a quality score. The compatibility score and the quality score can be used to help find and rate any number of applications.

35 Claims, 3 Drawing Sheets

SYSTEM FOR ASSESSING AN APPLICATION FOR TABLET COMPATIBILITY AND QUALITY

BACKGROUND

Mobile applications have been widely developed for smartphones, one of the first widespread mobile platforms. Tablets came after smartphones and can be considered a second-generation mobile platform. Rather than redeveloping their smartphone apps to take full advantage of the larger screen size and different format of the tablet, software developers often offer their smartphone apps with few or no changes to take full advantage of the tablet platform. Such applications have been ported to larger format devices such as tablets without making adaptations to optimize the application for the tablet. As a result, a significant number of applications sold for tablets are of poorer quality in many respects compared to applications that have been developed or redeveloped specifically for tablets.

BRIEF SUMMARY

According to an implementation of the disclosed subject matter, a method includes evaluating at least one application based on at least one tablet compatibility criterion. A tablet compatibility score may be assigned to the at least one application. The at least one application may be evaluated based on at least one quality criterion, and a quality score may be assigned to the at least one application.

An implementation of the disclosed subject matter provides a system including a processor configured to evaluate at least one application based on at least one tablet compatibility criterion, and assign a tablet compatibility score to the at least one application. Next, the at least one application may be evaluated based on at least one quality criterion, and a quality score may be assigned to the at least one application.

Implementations of the disclosed subject matter provide a tablet application classifier for assessing an application for tablet compatibility and quality. The disclosed system may incentivize tablet application developers to improve the quality of their applications by implementing certain qualities that will result in higher user satisfaction. This may result in improved tablet application compatibility and quality, as well as increased tablet user satisfaction. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
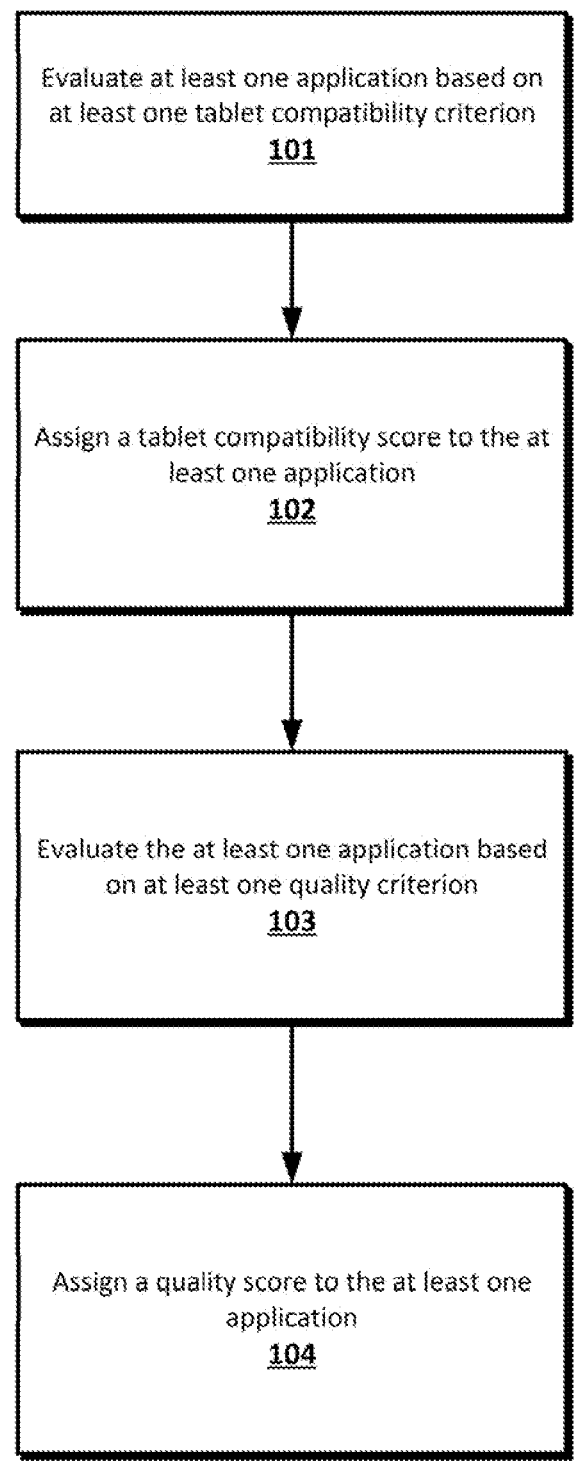
FIG. 1 shows an example process according to an implementation of the disclosed subject matter.

The present disclosure provides a tablet application classifier for assessing a software application for tablet compatibility and quality. The disclosed system may incentivize tablet application developers to improve the quality of their applications by implementing certain qualities that will result in a higher rating, such as a higher tablet compatibility score and/or higher quality score.

A tablet, such as a tablet device, a tablet computer, and the like, may be a mobile computer that can include a display, circuitry and battery in a single unit. Tablets can be larger than smartphones or personal digital assistants (PDA). Because of several factors such as a larger screen size, the often different format of the tablet as compared to smartphones and PDAs, and the different software and physical platform used for tablets, it may be advantageous to evaluate the compatibility of an application to a tablet.

Evaluating an application for tablet compatibility may include analyzing, for example, objective requirements based on at least one tablet compatibility criterion. Tablet compatibility criteria, as discussed in further detail below, may include any factors and/or features that may help to determine whether an application is compatible with a tablet. For example, the presence of tablet-specific screenshots, such as screenshots that show the application operating in a tablet-specific format. Also, tablet- and/or smartphone versions of the software development kit (SDK) version to which the application is targeted may be detected, as well as the maximum SDK version that the application can support. Both can be useful indicators as to whether the application was designed primarily for a smartphone or a tablet. There may be a tablet-enabled version of an application format that may indicate that an application version is compatible on a tablet. The SDK version of an application and/or the maximum SDK version of an application may be compared to the tablet-enabled version of an application format to determine if the application is compatible with a tablet. For example, the tablet-enabled version of an application may be version 11. A determination that the SDK version of an application and/or the maximum SDK version of an application are greater than version 11 may indicate that an application is tablet compatible. The existence of any telephony requirements by the application may indicate that the application was designed for a smartphone, not a tablet. Other factors may include the target screen size(s) of the application, the pixel density of the application's graphics, etc. Additionally, the percent of contiguous monochromatic space (e.g., whitespace, background color, etc.) in the tablet-specific screenshots may indicate graphics that were designed for a smartphone and simply expanded onto a tablet-sized screen. The tablet application classifier may rate the application's compatibility for a tablet platform by determining a tablet compatibility score based on the results of the tablet compatibility evaluation. The tablet compatibility score may be used to filter applications in the application store and to present tablet-compatible applications to a user.

As discussed in further detail below, evaluating an application for quality may include assessing the quality of the application when displayed and used on a tablet. For example, the quality of an application may be based on criteria such as whether an application is available in different languages in which the application has been manually translated, rather than machine translated versions. Another factor may be whether a feature graphic representing the application for a tablet exists, whether a promotional video for the tablet version exists, the last time the application file format for the application was updated, the last time the application's metadata was updated, etc. As a result, the tablet application classifier may assign a quality score to the application based on the quality criteria, and the quality score may be used to rank applications within application search results presented to a user.

In general, methods and systems are provided for assigning a tablet compatibility score and quality score to an application. FIG. 1 shows an example process according to an implementation of the disclosed subject matter. A method may include evaluating an application based on at least one tablet compatibility criterion, at 101, and a tablet compatibility score may be assigned to the application, at 102. Next, at 103, the application may be evaluated based on at least one quality criterion, and a quality score may be assigned to the application, at 104.

As shown at 101, evaluating an application for tablet compatibility may include evaluating, for example, objective requirements associated with the tablet compatibility of the application based on at least one tablet compatibility criterion. Tablet compatibility criteria, as mentioned above, may include any characteristics, qualities, factors and/or features that may help to determine whether an application is compatible with a tablet. For example, tablet compatibility criterion may be a measurement of whitespace in a screenshot taken of an application, a version of a target software development kit of an application, a resolution of a screenshot taken of an application, a maximum software development kit version of an application, one or more hardware requirements of an application, a supported screen size of an application, a high resolution resource folder in an application, and the like. Tablet compatibility criteria may include any combination of tablet compatibility criterion.

In some instances, tablet compatibility criteria may be based on determining characteristics of a screenshot taken of an application. For example, a whitespace and/or a resolution of a screenshot taken of an application may indicate whether an application is compatible with a tablet. Specifically, a low ratio of whitespace in a screenshot may indicate that the application has been purposely designed with a larger screen layout such as occurs on a tablet. This could contribute to a higher tablet compatibility score for such an application. Resolution of a screenshot of the application may be used to indicate that the application was developed for a tablet, for example, a resolution of 1,280×720 pixels may be an indicator that the application was developed for a tablet-size device, thereby raising the compatibility score. Resolution and/or application metadata may also be used to determine the screen size supported by the application. A higher resolution may imply a design meant for a larger, tablet-sized screen, thereby raising the score. Application metadata may include information associated with the screen size supported by an application. Additionally, a developer of an application may indicate the screen size supported by an application. Another tablet compatibility criterion may be the presence of a resource folder and high resolution qualifiers, i.e., in addition to or in place of the use of icons in an application. For example, the presence of high resolution resource folders may suggest that the application has the necessary assets to support tablets.

Tablet compatibility criteria may also include criteria associated with determining a software development kit version of an application. For example, determining a target software development kit of an application may indicate the device-type and/or screen size targeted in developing the application. This can be used to discern applications specifically designed for a tablet from those designed primarily for a smaller format smartphone. As another example, determining a maximum software development kit version of an application may indicate the maximum device-type and/or screen size supported by the application. Further, one or more hardware requirements of an application may be used to determine the type of device on which the application is likely intended to be used. For example, if an application requires the use of telephony or SMS features, this may indicate that the application is intended to be used on a smartphone rather than a tablet, thereby lowering the compatibility score. Tablet compatibility criteria may include any one criterion or combination of criteria described herein or any other criterion not described herein that may be indicative of the tablet compatibility of an application.

At 102, a tablet compatibility score may be assigned to an application based on the at least one tablet compatibility criterion. In some instances, a tablet compatibility score may be a number, a percentage, a binary result such as pass/fail, compatible/incompatible, and the like, indicating whether an application is compatible with a tablet. Each of the tablet compatibility criterion evaluated for an application may be given the same weight or varying weight depending on the importance of a criterion relative to other criterion. Additionally, a tablet compatibility criterion may weigh positively or negatively toward tablet compatibility. For example, each tablet compatibility criterion may be associated with a possible point value (such as 0 points, +1 point, −1 point, etc.) given to the application. For example, a city-guide application may be evaluated based on one or more tablet compatibility criterion such as a measurement of whitespace in a screenshot taken of the application, a version of a target software development kit of the application, a resolution of a screenshot taken of the application, a maximum software development kit version of the application, one or more hardware requirements of the application, the supported screen size of the application, and the presence of a high resolution resource folder in the application. In this case, tablet compatibility criterion such as the presence of a high resolution resource folder may weigh positively on the tablet compatibility of the application while the presence of one or more hardware requirements may weigh negatively on the tablet compatibility of the application. As shown in Table 1 below, evaluation results may correlate with points assigned to the city-guide application.

TABLE 1

| Tablet Compatibility Criteria | Evaluation Result | Points |
|---|---|---|
| Measurement of whitespace | Low ratio of whitespace | +1 |
| Version of a target software development kit | Greater than a tablet-enabled SDK version | +1 |
| Resolution of a screenshot | >1,280 × 720 | +1 |
| Maximum software development kit version | Maximum specified version is greater than a tablet-enabled SDK version | +1 |
| One or more hardware | Telephony feature required | −1 |

TABLE 1-continued

| Tablet Compatibility Criteria | Evaluation Result | Points |
|---|---|---|
| requirements | | |
| Supported screen size | Application metadata indicates large screen size support | +1 |
| Presence of a high resolution resource folder | Not present | 0 |
| | Tablet Compatibility Score | 5 |

As shown in Table 1, the city-guide application may receive 1 point for satisfying certain positive indicators for tablet compatibility (e.g., low ratio of whitespace, high resolution, large screen size supported, etc.), 0 points for the lack of high resolution resource folders, and −1 point for requiring a telephony feature. Additionally, the determination that the SDK version and the maximum SDK version of the city-guide application are greater than a tablet-enabled version may indicate that the application is tablet compatible, resulting in +1 point for each criterion. Based on the overall evaluation of the city-guide application, the application may be assigned a tablet compatibility score of 5.

In an implementation, specific tablet compatibility criterion may be given more weight than other criterion. For example, the measurement of whitespace may be more indicative of an application being tablet compatible as compared to other criterion, and an application may receive additional points for having low whitespace, such as +2 points as compared to other criterion which may result in only +1 point. As another example, the presence of one or more hardware requirements may be more indicative of an application being tablet incompatible as compared to other criterion, and as a result, an application may lose points, such as −3 points, for requiring one or more hardware features.

A technique for assigning a binary score for tablet compatibility to an application may be to set a minimum tablet compatibility requirement for an application to be considered table compatible. For example, a tablet application classifier may evaluate each of 7 tablet compatibility criterion for an application and a minimum tablet compatibility requirement may be that an application must satisfy 5 out of 7 tablet compatibility criteria. If an application meets this minimum tablet compatibility requirement, the application may be assigned a tablet compatibility score indicating that the application is tablet compatible. Other techniques not described herein may be used for assigning a tablet compatibility score to an application.

As shown at 103, evaluating an application for at least one quality criterion may include evaluating, for example, objective and/or subjective requirements associated with determining the quality of an application based on quality criteria. Quality criteria, as mentioned above, may include any characteristics, qualities, factors and/or features that may help to determine the quality of an application. Various examples of quality criterion are provided herein, however, any other quality criterion not described herein may be evaluated to determine the quality of an application. Quality criteria may include any combination of quality criterion.

In some instances, quality criteria may be based on characteristics associated with an application when presented in an application market place such as an application store. For example, quality criteria may include determining whether an application includes: a manual translation to a language, a promotional video, a feature graphic (e.g., some developers may use low quality badge graphics), a high resolution video, and duplicate images between device types (e.g., the screenshot of an application on a smaller tablet may be the same as on a larger tablet). Additionally, quality criteria may include: determining the aesthetic appeal of images in an application, performing image analysis of the featured graphic of an application (e.g., the feature image may be algorithmically analyzed based on similarity to a baseline of known high quality images provided by an application store provider), and determining the roundness of corners and/or shape of an icon for an application, and the like. Quality criteria may also include determining whether an application satisfies a minimum native language proficiency standard. For example, if an application is in the Japanese language, the text in the application may be compared to Japanese language standards to determine the grammar level and/or quality of the Japanese language text in the application. The weights of each criterion and/or the score given to a given application for a given criterion can be established using a supervised machine learning algorithm that can be trained on applications whose compatibility, quality and/or overall scores have been created or corrected by hand.

An application may be created and/or developed based on an application format. An application file format can be a file format used to distribute and/or install application software and middleware onto a platform with a given operating system. In some instances, an application may include an application file format that may be updated by the application at an application file format update time. In this case, the quality criteria may include determining the most recent application file format update time. Similarly, the quality criteria may include determining the last time metadata associated with an application was updated. Other information associated with the application file format may be included in the quality criteria. For example, quality criteria may include determining whether an application file format of an application has translations in one or more other languages. For example, if an application is initially written in English, the file format may include one or more translations in other languages, which may indicate that the application is of a high quality.

Other characteristics associated with the application file format of an application may be included in the quality criteria. Examples of characteristics associated with the application file format may be whether the application includes: advanced user interface design patterns (e.g., "the pull-to-refresh" pattern, which allows users to pull down on a list of content in order to refresh it); multiple application file formats, wherein each file format is targeted to different device configurations; support for all native platform types, and the like. Other quality criteria may be the number of screens/activities in an application, the file format size, the number of in-application products, the size of the code in the main file format package of an application, the use of an analytics package in the application, and the like.

Quality criteria may also include information related to the developer of an application. For example, quality criteria may include determining a policy violation history for a developer of an application, determining a size of an application catalog for a developer of an application, determining a frequency of application updates provided for an application, determining an age of a developer account of a developer of an application, determining one or more ratings of one or more other applications by a developer of an application, and the like.

External factors associated with an application may also be included in quality criteria. For example, quality criteria may include determining a ratio of uninstall actions to install actions associated with an application, determining a number of reported crashes associated with an application, determining a repeat usage of an application by users of the application, determining a revenue generated by an application, and the like.

Further, quality criteria may include evidence of pre-release performance testing for an application. An application developer may instrument the code with a performance analysis library such that when the application executes, the library checks for performance issues. This can be used as part of a pre-release phase, such as quality assurance (QA) testing, before the application is released to the public. The analysis library can check for crashes, slow execution, high memory usage, high battery usage, and other metrics. Quality criteria may include the existence of such a library. In particular, an application may be decompiled and analyzed to determine if it includes code to check for performance problems. If this code exists, it may be determined that the performance of the application was being tested, which may be an indicator of good quality.

Quality criteria may include any one criterion or combination of criteria described herein or any other criterion not described herein that may be indicative of the quality of an application. As shown in FIG. 1, a quality score may be assigned to an application based on the quality criteria, at 104. Similar to the tablet compatibility score discussed above, a quality score may be a number, a percentage, a binary result such as pass/fail, high quality/low quality, and the like, indicating the quality of an application based on an evaluation of quality criteria for an application. Each of the quality criterion evaluated for an application may be given the same weight or varying weight depending on the importance of a criterion relative to other criterion. Additionally, each quality criterion may weigh positively or negatively toward tablet compatibility. For example, quality criterion may be associated with a possible point value (such as 0 points, +1 point, -1 point, etc.) given to the application. In an implementation, specific quality criterion may be given more weight than other criterion. For example, the presence of multiple application file formats may be more indicative of an application being of high quality as compared to other criterion, and an application may receive additional points for having multiple application file formats, such as +2 points as compared to other criterion which may result in only +1 point. As another example, the presence of a large number of policy violations associated with the developer of an application may be more indicative of an application being of low quality as compared to other criterion, and as a result, an application may lose points, such as -3 points, for being an application from this developer.

A technique for assigning a binary score for quality of an application may be to set a minimum quality requirement for an application to be considered of high quality. For example, a tablet application classifier may evaluate each of forty tablet compatibility criterion for an application and a minimum tablet compatibility requirement may be that an application must satisfy twenty five out of forty quality criteria. If an application meets this minimum quality requirement, the application may be assigned a quality score indicating that the application is high quality. Any suitable technique may be used for assigning a quality score to an application.

Figure 2:
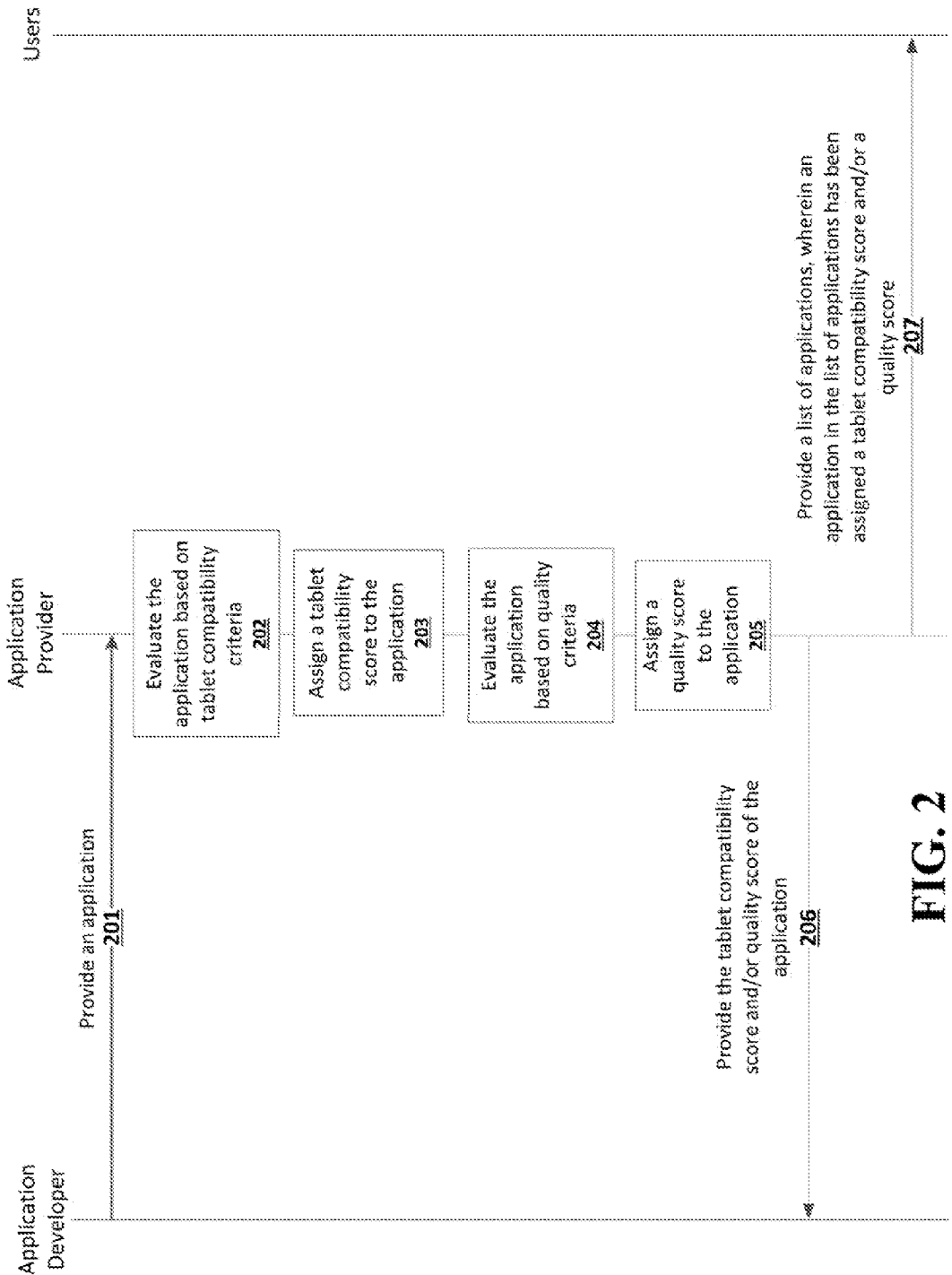
FIG. 2 shows an example information flow according to an implementation of the disclosed subject matter.

FIG. 2 shows an example information flow according to an implementation of the disclosed subject matter. An application developer may provide an application to an application provider, at 201. A system, such as that of an application provider, may include a processor configured to evaluate an application based on tablet compatibility criteria, at 202. As a result, the application provider may assign a tablet compatibility score to the application, at 203. Next, at 204, the application may be evaluated based on quality criteria, and a quality score may be assigned to the application, at 205.

As an example of an implementation of the disclosed subject matter, a tablet application classifier may evaluate applications (such as a weather application, a traffic application, and a photo editing application) for tablet compatibility and quality. The tablet application classifier may analyze each application based on tablet compatibility criteria such as the presence of tablet-specific screenshots, the SDK version to which the application is targeted, the maximum SDK version that the application can support, telephony requirements by the application, the target screen sizes of the application, the pixel density of the application's graphics, and the percent of whitespace in the tablet-specific screenshots. Based on these criteria, the tablet application classifier may assign a tablet compatibility score to each application. For example, the weather application may receive a tablet compatibility score of 8, the traffic application may receive a tablet compatibility score of 7, and the photo editing application may receive a tablet compatibility score of 3. Additionally, the tablet application classifier may analyze each application based on quality criteria such as a whether a feature graphic representing the application exists, whether a promotional video exists, the last time the application file format was updated, the last time the metadata of the application was updated and the like. Based on these criteria, the tablet application classifier may assign a quality score to each application. For example, the weather application may receive a quality score of 6, the traffic application may receive a quality score of 8, and the photo editing application may receive a quality score of 5. The compatibility and quality scores for an application may be combined into an overall application score and/or they may be used separately.

The tablet compatibility score and/or the quality score may be used in a variety of ways. For example, as shown in FIG. 2, an application provider may provide the tablet compatibility score and/or the quality score to the developer of the application, at 206. The developer may use the tablet compatibility score and/or the quality score to make changes to their application, for example to improve tablet compatibility and/or quality of the application. Additionally, an overall application score may be generated by combining the tablet compatibility score and the quality score of the application.

As shown in FIG. 2, a list of applications comprising a plurality of applications may be provided, for example to users of an application store, at 207. Each application in the list of applications may have been assigned a tablet compatibility score, a quality score, and/or an overall score. In this case, the list of applications may be sorted, ranked, and/or filtered based on any one or combination of the tablet compatibility score, quality score, and overall score. For example, each application in the list of applications may have at least a minimum tablet compatibility score, quality score, and/or overall score. In addition, the applications in the list of applications may be ranked based on the quality score of each application, the tablet compatibility score of each application, and/or the overall score of each application.

Further to the example above, a user may search for applications available from an application provider, for example using a keyword search. The search results may be filtered based on a minimum tablet compatibility score of the applications, for example the minimum tablet compatibility score may be 5 or greater. The filters may be provided by the user, e.g., only show applications with a tablet compatibility score above 8 and a quality score above 7. Accordingly, the application search results may include the weather application with a tablet compatibility score of 8 and the traffic application with a tablet compatibility score of 7; however the photo editing application with a tablet compatibility score of 3 may not be included in the search results. Additionally, the application search results may be ranked based on the quality score of the applications. Accordingly, the traffic application may be presented higher in the list because it received a quality score of 8 whereas the weather application may be presented lower in the list because it received a quality score of 6. Based on this tablet compatibility filtering and quality ranking, a user may be able to discover applications that are likely to be compatible with her tablet and which are of a predetermined quality.

According to various implementations, the disclosed subject matter may be used for online digital marketplaces and clearinghouses (such as a digital library) at which users can identify and purchase, borrow or use any number of applications. Further, implementations can be used to discern content (graphics, virtual reality displays, photographs, video, etc.) that may have been specifically designed for a smaller format or a device other than a tablet from content that has been developed to be used optimally on a tablet. As used herein, the term "application" includes content. Implementations can be used to score, rate and help find any number of applications.

In an implementation, the communication between an application provider, an application developer, and/or users may occur across one or more bridges between the interfaces. For example, the communications between the application developer and the application provider may be managed or assisted by a third device, such as, a coordinating device, a local coordinator, a remote server, etc. In such cases, the third device may, for example, receive an application from the developer and evaluate the application based on tablet compatibility criteria and/or quality criteria. The third device may then provide the tablet compatibility and/or quality criteria to the application provider, in which case, the application provider may assign a tablet compatibility score and/or quality score. Alternatively, the third device may evaluate the application based on tablet compatibility criteria and/or quality criteria and assign a tablet compatibility score and/or quality score to the application. The third device may then provide the tablet compatibility score and/or quality score to the application provider and/or the application developer. The application provider may provide the application to users based on the tablet compatibility score and/or quality score of the application. In an embodiment, the third device may also act as a bridge between the application provider and the users when providing the application to the users. Furthermore, more than one intermediate device may be implemented to facilitate communication between users, an application provider, and an application developer.

Figure 3:
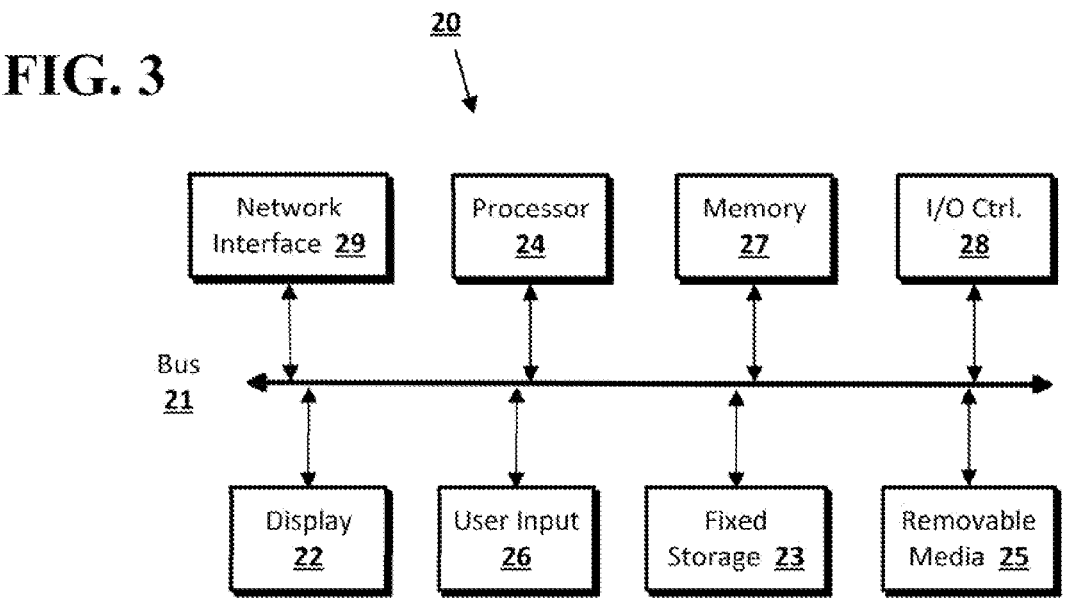
FIG. 3 shows a computer according to an embodiment of the disclosed subject matter.

Embodiments of the presently disclosed subject matter may be implemented in and used with a variety of component and network architectures. FIG. 3 is an example computer 20 suitable for implementing embodiments of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 4.

Many other devices or components (not shown) may be connected in a similar manner (e.g., document scanners, digital cameras and so on). Conversely, all of the components shown in FIG. 3 need not be present to practice the present disclosure. The components can be interconnected in different ways from that shown. The operation of a computer such as that shown in FIG. 3 is readily known in the art and is not discussed in detail in this application. Code to implement the present disclosure can be stored in computer-readable storage media such as one or more of the memory 27, fixed storage 23, removable media 25, or on a remote storage location.

Figure 4:
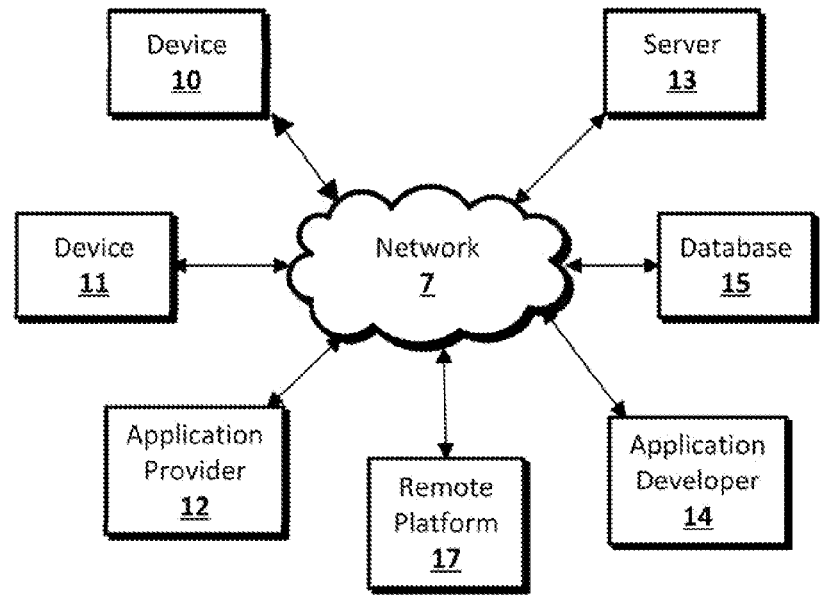
FIG. 4 shows a network configuration according to an embodiment of the disclosed subject matter.

FIG. 4 shows an example network arrangement according to an embodiment of the disclosed subject matter. One or more clients 10, 11, such as local computers, smart phones, tablet computing devices, and the like may connect to other devices such as application provider 12, application developer 14, via one or more networks 7. The network may be a local network, wide-area network, the Internet, or any other suitable communication network or networks, and may be implemented on any suitable platform including wired and/or wireless networks. The clients may communicate with one or more servers 13, application provider 12, application developer 14, and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13, application provider 12, application developer 14, and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
    evaluating at least one application based on at least one tablet compatibility criterion;
    assigning a tablet compatibility score to the at least one application;
    evaluating the at least one application based on at least one quality criterion, comprising:
        decompiling the at least one application, and
        determining, based on the decompiling of the at least one application, the presence of code within the at least one application used to check for performance issues of the at least one application;
    assigning a quality score to the at least one application, wherein the quality score is based at least in part on whether code used to check for performance of issues of the at least one application was determined to be present in the at least one application; and
    including the at least one application in presented search results when the tablet compatibility score is at least a minimum tablet compatibility score and not including the at least one application in the presented search results when the tablet compatibility score is not at least the minimum tablet compatibility score.

2. The method of claim 1, wherein the at least one tablet compatibility criterion comprises determining whitespace in a screenshot taken of the at least one application.

3. The method of claim 1, wherein the at least one tablet compatibility criterion comprises determining a version of a target software development kit of the at least one application.

4. The method of claim 1, wherein the at least one tablet compatibility criterion comprises the resolution of a screenshot taken of the at least one application.

5. The method of claim 1, wherein the at least one tablet compatibility criterion is at least one selected from the group consisting of: a measurement of whitespace in a screenshot taken of the at least one application, a version of a target software development kit of the at least one application, a resolution of a screenshot taken of the at least one application, a maximum software development kit version of the at least one application, one or more hardware requirements of the at least one application, a supported screen size of the at least one application, a high resolution resource folder in the at least one application.

6. The method of claim 1, wherein the at least one application includes an application file format that is updated by the at least one application at an application file format update time and wherein the at least one quality criterion comprises determining the most recent application file format update time.

7. The method of claim 1, further comprising evaluating at least one additional quality criterion, wherein the at least one additional quality criterion comprises determining at least one pre-release performance criterion for the at least one application.

8. The method of claim 1, further comprising evaluating at least one additional quality criterion, wherein the at least one additional quality criterion comprises determining whether the at least one application satisfies a minimum native language proficiency standard.

9. The method of claim 1, further comprising evaluating at least one additional quality criterion, wherein the at least one additional quality criterion comprises determining whether an application file format of the at least one application includes one or more translations.

10. The method of claim 1, further comprising evaluating at least one additional quality criterion, wherein the at least one additional quality criterion is at least one selected from the group consisting of: determining a policy violation history for a developer of the at least one application, determining a size of an application catalog for a developer of the at least one application, determining a frequency of application updates provided for the at least one application, determining an age of a developer account of a developer of the at least one application, and determining one or more ratings of one or more other applications by a developer of the at least one application.

11. The method of claim 1, further comprising evaluating at least one additional quality criterion, wherein the at least one additional quality criterion is at least one selected from the group consisting of: determining a ratio of uninstall actions to install actions associated with the at least one application, determining a number of reported crashes associated with the at least one application, determining a repeat usage of the at least one application by users of the at least one application, and determining a revenue generated by the at least one application.

12. The method of claim 1, further comprising generating an overall application score by combining the tablet compatibility score and the quality score of the at least one application.

13. The method of claim 1, further comprising providing a list of applications comprising a plurality of applications, wherein an application in the list of applications has been assigned a tablet compatibility score and a quality score.

14. The method of claim 1, further comprising providing a list of applications comprising a plurality of applications, wherein an application in the list of applications has at least a minimum tablet compatibility score.

15. The method of claim 14, further comprising ranking the plurality of applications in the list of applications based on the tablet compatibility score of each application.

16. The method of claim 1, further comprising providing a list of applications comprising a plurality of applications, wherein an application in the list of applications has at least a minimum quality score.

17. The method of claim 14, further comprising ranking the plurality of applications in the list of applications based on the quality score of each application.

18. The method of claim 1, further comprising providing at least one of the tablet compatibility score and the quality score to a developer of the at least one application.

19. A system comprising:
a processor configured to:
evaluate at least one application based on at least one tablet compatibility criterion;
assign a tablet compatibility score to the at least one application;
evaluate the at least one application based on at least one quality criterion, by
decompiling the at least one application, and
determining, based on the decompiling of the at least one application, the presence of code within the at least one application used to check for performance issues of the at least one application;
assign a quality score to the at least one application, wherein the quality score is based at least in part on whether code used to check for performance of issues of the at least one application was determined to be present in the at least one application; and
include the at least one application in presented search results when the tablet compatibility score is at least a minimum tablet compatibility score and not include the at least one application in the presented search results when the tablet compatibility score is not at least the minimum tablet compatibility score.

20. The system of claim 19, wherein the at least one tablet compatibility criterion comprises determining whitespace in a screenshot taken of the at least one application.

21. The system of claim 19, wherein the at least one tablet compatibility criterion comprises determining a version of a target software development kit of the at least one application.

22. The system of claim 19, wherein the at least one tablet compatibility criterion comprises the resolution of a screenshot taken of the at least one application.

23. The system of claim 19, wherein the at least one tablet compatibility criterion is at least one selected from the group consisting of: a measurement of whitespace in a screenshot taken of the at least one application, a version of a target software development kit of the at least one application, a resolution of a screenshot taken of the at least one application, a maximum software development kit version of the at least one application, one or more hardware requirements of the at least one application, a supported screen size of the at least one application, a high resolution resource folder in the at least one application.

24. The system of claim 19, wherein the at least one application includes an application file format that is updated by the at least one application at an application file format update time and wherein the at least one quality criterion comprises determining the most recent application file format update time.

25. The system of claim 19, wherein the processor is further configured evaluate at least one additional quality criterion, wherein the at least one additional quality criterion comprises determining at least one pre-release performance criterion for the at least one application.

26. The system of claim 19, wherein the processor is further configured evaluate at least one additional quality criterion, wherein the at least one additional quality criterion comprises determining whether the at least one application satisfies a minimum native language proficiency standard.

27. The system of claim 19, wherein the processor is further configured evaluate at least one additional quality criterion, wherein the at least one additional quality criterion comprises determining whether an application file format of the at least one application includes one or more translations.

28. The system of claim 19, wherein the processor is further configured evaluate at least one additional quality criterion, wherein the at least one additional quality criterion is at least one selected from the group consisting of: determining a policy violation history for a developer of the at least one application, determining a size of an application catalog for a developer of the at least one application, determining a frequency of application updates provided for the at least one application, determining an age of a developer account of a developer of the at least one application, and determining one or more ratings of one or more other applications by a developer of the at least one application.

29. The system of claim 19, wherein the processor is further configured evaluate at least one additional quality criterion, wherein the at least one additional quality criterion is at least one selected from the group consisting of: determining a ratio of uninstall actions to install actions associated with the at least one application, determining a number of reported crashes associated with the at least one application, determining a repeat usage of the at least one application by users of the at least one application, and determining a revenue generated by the at least one application.

30. The system of claim 19, further comprising generating an overall application score by combining the tablet compatibility score and the quality score of the at least one application.

31. The system of claim 19, further comprising providing a list of applications comprising a plurality of applications, wherein an application in the list of applications has been assigned a tablet compatibility score and a quality score.

32. The system of claim 31, further comprising ranking the plurality of applications in the list of applications based on the tablet compatibility score of each application.

33. The system of claim 19, further comprising providing a list of applications comprising a plurality of applications, wherein an application in the list of applications has at least a minimum tablet compatibility score.

34. The system of claim 19, further comprising providing a list of applications comprising a plurality of applications, wherein an application in the list of applications has at least a minimum quality score.

35. The system of claim 19, further comprising providing at least one of the tablet compatibility score and the quality score to a developer of the at least one application.

* * * * *